242-211. OR RE19559 EX

Examiner

May 7, 1935.

C. A. GODSHALK ET AL

FISHING REEL

Original Filed May 2, 1932 2 Sheets-Sheet 1

Re. 19,559

Orig. 1,904,992

INVENTORS

Clarence A. Godshalk,
Frederick Henke,
David Behrsing.

BY Harrison E. Monteith
ATTORNEY

WITNESS

F. J. Hartman.

WINDING & REELING
84.7
May 7, 1935. C. A. GODSHALK ET AL Re. 19,559
FISHING REEL
Original Filed May 2, 1932 2 Sheets-Sheet 2
Modif
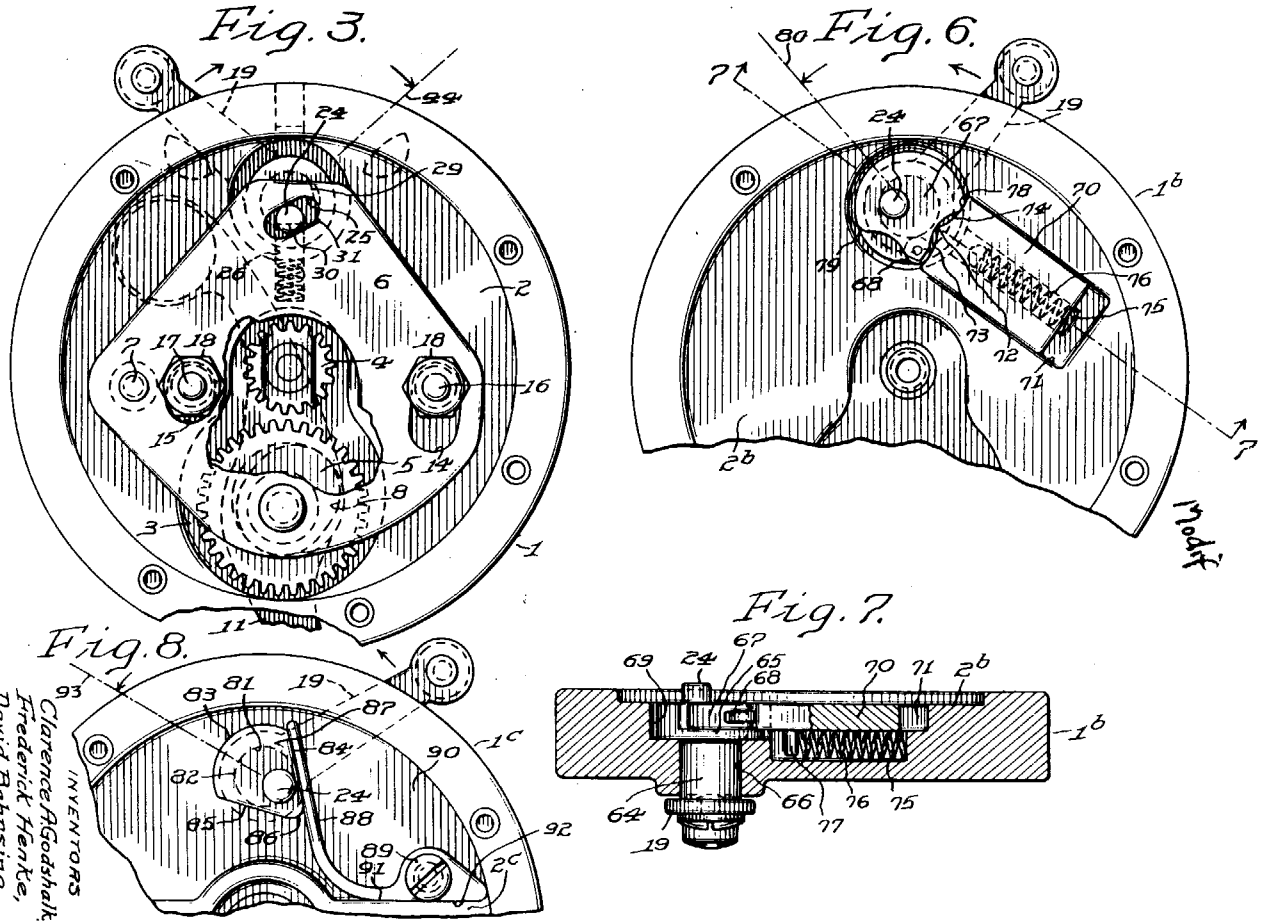
INVENTORS
Clarence A. Godshalk,
Frederick Henke,
David Behrsing.
WITNESS
F. J. Hartman.
BY Harold B. Moulton
ATTORNEY

WINDING & REELING 84.7

Examiner

Reissued May 7, 1935

Re. 19,559

UNITED STATES PATENT OFFICE 19,559

FISHING REEL

Clarence A. Godshalk, Ardmore, and Frederick Henke and David Behrsing, Philadelphia, Pa., assignors, by mesne assignments, to Ocean City Manufacturing Co., Philadelphia, Pa., a corporation of Pennsylvania Original No. 1,904,992, dated April 25, 1933, Serial No. 608,600, May 2, 1932. Application for reissue January 27, 1934, Serial No. 708,706

8 Claims. (Cl. 242—84.7)

This invention relates to that type of fishing reels, known as free spool reels and embodying in their construction a mechanism whereby the driving gear of the winding mechanism may be moved out of mesh with the pinion on the spindle of the spool, thus permitting the spool to revolve freely to pay out the line from the reel, as in casting, in order that the hook and bait may be cast for long distances without any retardation of the speed with which the line is delivered due to an engagement of the driving spindle with the spool through the gearing. Since the spool is released at a critical point, in casting, to get the longest throw or cast, it is highly desirable that the manipulation of the release control lever should be certain, positive and rapid in its action.

In the free spool gear releasing mechanisms as heretofore constructed, it has been customary to apply a friction directly or indirectly to the releasing lever, making it necessary for the fisherman to push the reel releasing lever from one end of its path of movement to the other against the resistance of such friction applying mechanisms and in the excitement of the sport it often happens that in releasing the spool from the driving mechanism, the gears are moved only partly out of mesh in casting with the result that distance is not attained or in winding in they are partly out of mesh, with the result that an undue and unnecessary wear is imposed upon the gears, and the gears wear out rapidly under this common and frequent failure of the fisherman to positively throw the releasing lever to the extreme limits of its motion. It is the object of the present invention to provide a reel of the class described wherein, when the fisherman, in casting, moves a reel releasing lever through only a part (substantially one-half) of its complete travel in throwing the gearing into and out of mesh, an automatic means comes into play to complete the motion and insure the travel of the spool releasing lever to the full end or limit of its movement thereby moving the driving gear to a position where the gears are with certainty held completely out of contact or engagement.

It is a further object of the present invention to provide an automatic mechanism to also automatically throw the lever to the opposite limit of its movement after it has been manually moved through substantially one-half of its movement so that the gears may not be partly but must be completely in mesh for the purpose of enabling the fisherman to wind in the line upon the spool.

A further object of this invention is to provide a free spool reel with the automatic mechanism above referred to which is simple, is completely concealed, is certain in its action, and is not likely to become worn or to be easily broken or disarranged.

Further objects of the invention will appear in the specification and claims below.

Referring to the drawings forming a part of this specification and wherein the same reference characters are employed throughout the various views to designate the same parts, Figure 1 is an end view of the inner side of the headplate of a fishing reel with the spool removed to show the winding mechanism and the spool releasing mechanism, the gear being shown in mesh to permit the fisherman to rotate the crank and drive the gear to draw in or wind up the line on the spool;

Fig. 3 is a view similar to Fig. 1 but showing the gearing out of mesh whereby the spool is free to rotate, to pay out the line in casting, without retardation or hindrance due to the driving mechanism;

Fig. 6 illustrates a further modification of the reel freeing or releasing mechanism; and Fig. 7 is a transverse sectional view on the line 7—7 of Fig. 6;

Fig. 8 is a fragmentary view of a still further modification of the invention.

Figures 1, 2, 4, 5:
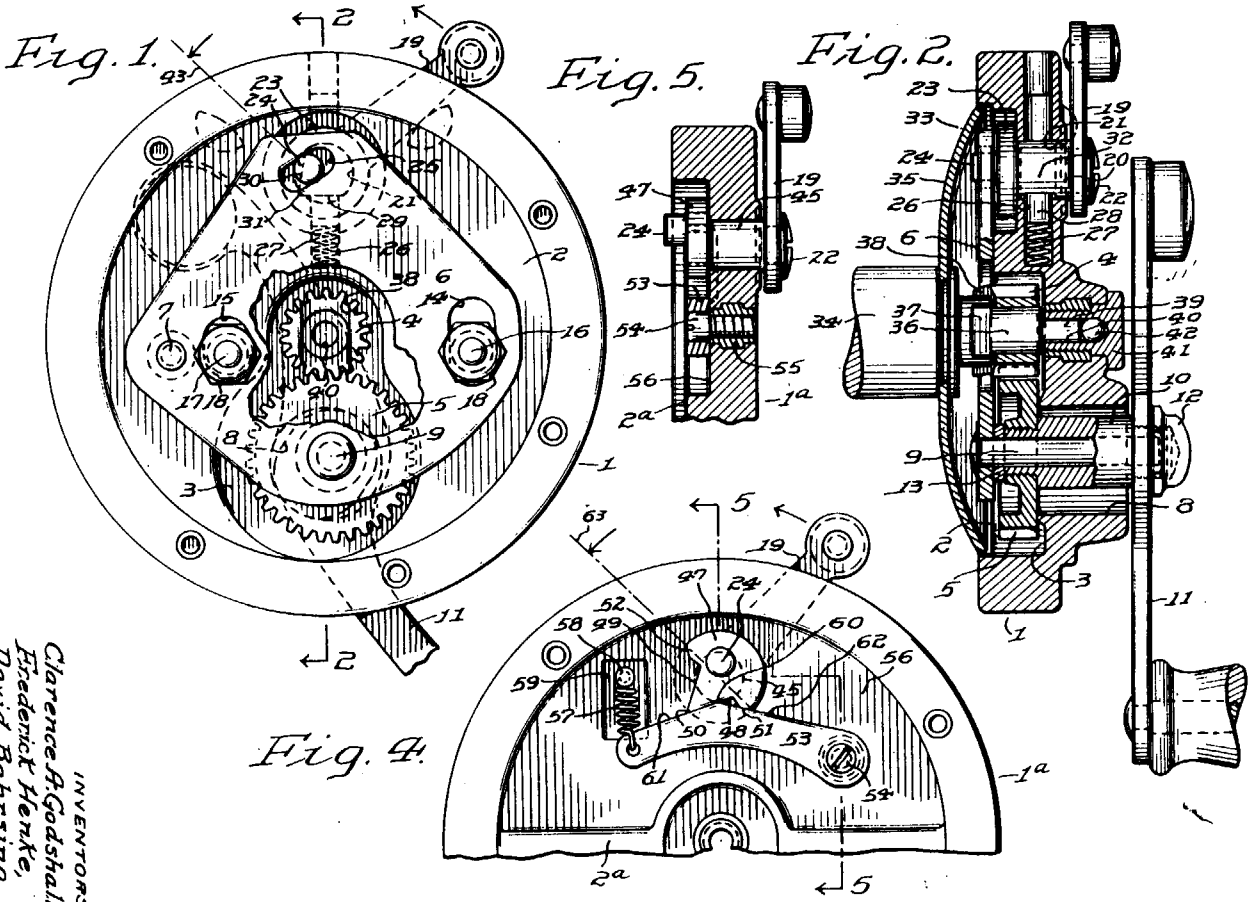
Fig. 2 is a vertical cross-sectional view of the said headplate with the adjacent end of the spool in the position it occupies in the assembled structure.
Fig. 4 is a fragmentary view of the back of the inner side of a headplate of a fishing reel showing a modified form of the invention.
Fig. 5 is a fragmentary vertical sectional view on the line 5—5 of Fig. 4.

Referring first to the modification shown in Figs. 1 to 3 inclusive, wherein is shown as much of the mechanism of a fishing reel as is necessary for an understanding of this invention, the headplate 1 having a slightly depressed circular area 2 and deeper recess 3 for the reception of the spool pinion 4 and the driving gear 5, said gears being located beneath a plate 6 mounted pivotally on a stud 7 embedded in the headplate 1 and projecting outwardly therefrom through the plate 6.

The bottom of this recess 3 is provided with a rather large hole 8 which extends through to the front of the end plate.

Secured rigidly to the plate 6 and extending downwardly therefrom through the hole 8 is a stud shaft 9 on which is rotatably mounted a sleeve 10 over one reduced end of which is tightly screwed the driving gear 5 and over the other reduced end of which is screwed the handle or crank 11, held in place on said sleeve by a lock nut 12.

A suitable washer 13 is suitably interposed on the said shaft 9 between the plate 6 and the hub of the gear 5 and since the gear is larger in diameter than the hole 8, the gear 5 and sleeve 10 unitary therewith, are prevented from longitudinal movement on the said shaft 9. The plate 6 is also provided with slots 14 and 15 through which extend studs 16, 17 respectively, the ends of said studs being threaded and provided with nuts 18, respectively. The slots 14, 15 extend substantially concentric with the axis of the stud 7 and these nuts hold the plate 6 flat against the surface of the depressed area 2 but free to be rotated or slid on said surface 2 about the stud 7 as a center. The free spool lever 19 is mounted on the front side of the headplate 1 on a shaft 20 having a smooth bearing 21 in the headplate 1, the handle 19 being secured to the outer end of the shaft 20 by a screw 22. The opposite end of said shaft 2 is provided with a flange 23 and crank pin 24 extending outwardly therefrom and through a slot 25 in the plate 6, the crank pin being eccentric with respect to the axis of the shaft 20. The material of the headplate 1 is provided with a hole 26 preferably extending radially from the axis of the pinion 4 and through the axis of the bearing 21, and before the shaft 20 is inserted into its smooth bearing 21 a coil expansion spring 27 is placed in the bottom of said hole 26 and upon that is placed a cylindrical plunger 28 having a flat upper surface.

At the place where the upper end of this plunger 28 engages the shaft 20, the shaft is provided with two adjoining flat surfaces 29 and 30 meeting in an acute angle or sharp edge 31, the same forming a cam 32, the operation of which will be described below.

The spool 33 (one end only of which is shown in Fig. 2) comprises a spool spindle 34 having flanges 35 rigidly secured to the ends thereof and curving preferably into and just clearing the walls of the depressed area 2 on the inner side of the plate 1, thus covering in the assembled reel all the mechanism shown in Fig. 1, and located on the inner side of the headplate 1. The spool spindle 34 is provided with a cylindrical section or portion 36 and flattened portion 37 between said cylindrical portion 36 and the flange 35. The pinion 4 is provided with a central cylindrical hole which fits the cylindrical portion 36 of the spindle and the end of the pinion adjacent the flange 35 of the spool is provided with a milled transverse slot or cut 38, the sides of which fit against the flattened sides of the section 37 and in this way, by merely slipping the pinion 4 over the end of the spindle to fit on the cylindrical portion 36 and by turning it until the slot or cut 38 registers with the flattened portion 37 of the shaft and permits the flattened portion to enter the slot, the pinion 5 is automatically keyed to the spool spindle 34. Beyond the cylindrical portion 36 the spindle is provided with a cylindrical bearing 39 which fits into a hole 40 in a bearing screw 41 threaded into a bushing 41' firmly embedded in the headplate 1 and the end of the cylindrical bearing 39 and a ball 42 in the bottom of the hole 40 forms a thrust bearing for the spool spindle 34.

From the above it will now be seen that the handle or crank 11, the sleeve 10, the driving gear 5 are all supported on the stud shaft 9 and are carried by the plate 6 and that the large hole 8 through which the sleeve 10 extends permits of movement of the handle and sleeve with the plate 7, with respect to the headplate 1.

Referring to Fig. 1 the parts are shown with the gears in mesh and by turning the crank or handle 11 and with it the driving gear 5, the spool 33 will be driven at a relatively high speed by reason of the engagement of the driving gear 5 with the pinion 4 and the gears will be relatively held firmly in mesh by the pressure of the plunger 28 against the flat surface 29 of the cam 32. When, however, one wishes to release the spool from the driving gear 5 he throws the lever 19 in the direction of the arrows in Fig. 1 rotating thereby the shaft 20 and the cam 32, and moving the crank pin 24 about the axis of the shaft 20 as a center. The rotation of this cam brings the sharp edge 31 to bear more firmly against the plunger 28 depressing it against the tension of the spring 27 and when the lever has been moved to a position in which it extends radially from the pinion 4, the sharp edge 31 will be the only contact between the cam 32 and the plunger 28. Now a slight movement of the lever 19 beyond this point causes the spring pressed plunger 28 to bear against the flattened surface 30 of the cam and thus throw the shaft 20 and the parts carried thereby further until the flat surface 30 lies flat against the upper flat surface of the plunger 28. In other words, the lever 19 will jump from the position half way of its complete throw to the limit of its throw in that direction, that is to say, to the position indicated by the dot-and-dash line 43 in Fig. 1.

But this rotation of the shaft 20 and with it the crank pin 24 in the slot 25 rotates the plate 6 about the stud 7 as a center moving the driving gear 5 away from the pinion 4 and when the angle 31 of the cam 32 is in its half-way position, the gear 5 is preferably just out of mesh with the pinion 4. But the parts cannot remain in that position. If the handle 19 is pushed the slightest beyond this point the spring-pressed plunger 29, acting on the cam 32 quickly throws the cam and the parts rigid therewith, including the handle 19, to the position shown in Fig. 3 with the teeth of the gearing 4—5 out of mesh and well clear of each other. In this position any slight accidental movement of the handle 19 will be insufficient to move the gear into mesh with the pinion 4.

To throw the gear 5 into mesh with the pinion 4, the reverse operation is practiced. Thus referring to Fig. 3, manual pressure on the lever 20 to the right depresses the plunger 28 and when the lever 19 is in its vertical position or just beyond its vertical position, the pressure of the said plunger is on the other side of the sharp angle 31 and against the surface 29 and the pressure of the plunger against this surface 29 snaps the lever back to the position shown by the dot-and-dash line 44 in Fig. 3, which is the position shown in Fig. 1, thereby quickly moving the teeth of the drive gear 5 into mesh with the pinion 4.

Thus, it is that the fisherman is required to move the lever 19 through a short distance only (substantially half over) to throw the gears completely into or out of mesh. The gears cannot remain partly in mesh or rubbing against each other but are either out of mesh, or completely in mesh, due to the automatic action of the spring pressed plunger 28 against the flat surfaces 29 and 30 of the cam 32 as soon as the edge 31 has passed beyond the dead center or half-way position.

In Figs. 4 and 5, in which is illustrated a modified form of the invention, all the parts have been removed from the headplate 1a except the mechanism for actuating the free spool controlling lever 19, which in this case is secured to its shaft 45 by the usual screw 22. This shaft 45 has a smooth bearing in the headplate 1a but the flange 46 on the inner end of the shaft has a cam 47 cut into a portion of the periphery thereof. This cam 47 is similar to the cam 32 shown in Figs. 1 and 3 in that it has two flat faces 48 and 49 meeting in a sharp edge or angle 50 and on each side of said flat faces, the flange is provided with shoulders or abutments 51—52.

Cooperating with this cam is a lever 53 pivoted at one end on a pivotal screw 54 threaded into a bushing 55 embedded in the headplate and the headplate 1a has a depression or recess 56 for the reception of the lever 53. The other end of the lever 53 is attached to a coil spring 57 mounted on a post 58 rigid with the headplate 1a and located in a recess 59. The lever is provided with an edge or angle 60 and flat surfaces 61—62 tapering slowly away from the edge or angle 60.

The axis of the shaft 45, edge or angle 50 of the cam 47, the edge or angle 60 of the lever 53 are in alinement with each other when the lever 19 is midway between the limits of its two positions.

The operation of the device is similar to that of the modification first described. Assuming the position shown in Fig. 4 to be the position of that in which the driving gear 5 is in mesh with the spool pinion 4, when the operator pushes the lever 19 in an anti-clockwise direction (from the position shown in Fig. 4) the sharp angle of the cam 47 slides over the surface 61 until it rides the sharp angle 60 on the lever 53 in which position the lever 19 will be substantially radial with respect to the axis of the reel, and in so doing, the cam 47 will depress the lever 53 against the tension of the spring 57, but as soon as the edge 50 goes beyond the edge 60 and is in engagement with the tapering surface 62, the tension of the spring 57 will quickly throw the cam and the parts connected thereto (to wit the lever 19) to the full end of the limit of its motion. In the position shown in Fig. 4 the abutment 51 will be in engagement with the surface 62 and will operate as a stop to prevent the tension of the spring from rotating the cam and the parts connected therewith beyond the position in a clockwise direction from that shown in Fig. 4, and, conversely, when the lever 19 is in its other position, indicated by the dot-and-dash line 63 in Fig. 4, the abutment or shoulder 52 will be in engagement with the flat surfaces 61 on the lever and will similarly hold the lever in that position.

The crank pin 24 projecting from the face of the cam 47 is the same pin 24 as that shown in Fig. 1, and it operates a pivoted plate 6 which it has been assumed has been removed from Figs. 4 and 5 for the purpose of clearly showing the automatic lever-throwing mechanism which lies thereunder.

In Figs. 6 and 7 is illustrated a further modification and, as in Figs. 4 and 5, the pivoted plate 6, together with all the other reel mechanism is assumed to have been removed from the reel head 1b except that for actuating the spool freeing lever 19.

In this modification the head plate 1b is provided with a depressed area 2b upon which is adapted to rest and slide a pivoted plate 6, as in Fig. 1, and the lever-throwing mechanism is mounted in recesses (to be referred to below) in the depressed area 2b.

The lever 19 is secured to the outer end of its shaft 64 by a screw 22 and the inner end of the shaft 64 is provided with a flange 65, longitudinal movement of the shaft in its smooth bearing 66 in the headplate 1b being prevented by the said flange 65 and the lever 19.

But a portion of the face of the flange 65 is cut away or otherwise formed to provide a cam 67 having a roller 68 journaled near the apex thereof. As in the modification shown in Figs. 4 and 5 the crank pin 24 projects outwardly from the face of the cam 67 for insertion into a slot 25 in a plate 6, as in Fig. 1. The flange 65 is seated in a depression 69 within the deeper area 2b, the face of the cam being substantially in the plane of the said area 2b, and the crank pin 24 extends upwardly through the plane of the plate 6, as clearly appears in Fig. 7. Cooperating with this cam 67 is a parallel sided member 70 longitudinally slidable in a recess 71 in the depressed area 2b. That end of the said member 70 which is adjacent the cam 67 is provided with a transverse edge or angle 72 from which the surfaces 73 and 74 slope slowly away.

In the bottom of the recess 71 for the member 70 is a deeper slot or recess 75 in which is seated a compression spring 76, one end of which presses against the end of the recess 75 and the other end of which presses firmly against a pin or lug 77 rigid with the member 70 and extending down into said recess 75. The path of the movement of the member 70 is radial with respect to the axis of the shaft 64 and the tension of the spring 76 is such as to hold the forward end of the member 70 yieldingly pressed against the cam 67. The sides of the cam 67 on each side of the roller 68 are concave and terminate in flat shoulders or abutments 78, 79, respectively, the shoulder 78 being in engagement with the surface 74 when the parts are in the position shown in Fig. 6, and the shoulder 79 being in engagement with the surface 73 when the lever 19 has been thrown to the other limit of its path of movement indicated by the dot-and-dash line 80 in Fig. 6.

The operation of the device should now be plain. Assuming the parts to be in the position shown in Fig. 6 in which the driving gear 5 is assumed to be in mesh with the spool pinion 4 as in Fig. 1. To release the pinion 5 from the driving gear 4, the operator pushes the lever 19 quickly in the direction of the arrows in Fig. 6, thus rotating the cam 67 in an anti-clockwise direction. The roller 68 traveling over the surface 73 reaches the edge 72 when the lever is half thrown over and in this position, the roller 68 and the edge or angle 72 will lie in a right line radial to the axis of the shaft 64 and the moment the said roller 68 passes over the edge or angle 72 to the tapering surface 74, the spring pressed member 70 automatically throws the cam and the parts connected thereto through the second half of their path of travel, the roller riding downwardly on the surface 74 until the abutment engages with the surface 73. In this position the lever 19 and the parts rigid therewith are firmly held in a stationary position by the pressure of the member 70 against the roller 68 and the abutment 79 with the gear 5 out of mesh with the pinion 40 in Fig. 3. To throw the gear 4 into mesh with the pinion 5, the operator merely reverses the operation last described by quickly pushing the lever 19 from the position indicated by the dot-and-dash line 80 to a position just beyond the half-way point in its path of movement, whereupon the spring pressed member 70 throws the cam 67 and the parts connected therewith quickly back to the original position in Fig. 6.

In Fig. 8 is shown a still further modification of this invention wherein the headplate 1c provides a smooth cylindrical bearing 81 for the shaft 82 of the free spool lever 19 on which is a flange 83 somewhat similar to the flange 46 of the modification shown in Figs. 4 and 5 in that a portion of it is cut away to form two converging tapering surfaces 84 and 85 terminating in a rounded edge or tip or apex 86 all to form a cam 87.

Cooperating with this cam 87 is a leaf-spring 88, one end of which is mounted on a pin or stud 89 rigidly secured to or embedded in the material of the head 1c. Preferably this spring 88 is mounted in a recess 90 below the surface 2c upon which the plate 6 (omitted for the sake of clearness) rests and slides. The wall of the recess provides a vertical shoulder 91 against which the flattened pivoted end 92 of the leaf-spring bears squarely and by which the spring is prevented from rotating about the pin or stud 89. The free end of this spring 86 extends upwardly to lie flat against the flat surface 84 of the cam 87 and to hold the same and the shaft 82 and the lever 19 mounted thereon at the limit of its motion in one direction and to lie flat against the other flat surface 85 when the lever 19 is thrown to rotate the cam in an anti-clockwise direction, and that rotation has been continued until the lever 19 has been moved through substantially one-half of its travel. At this point the rounded edge 86 will be in engagement with the free end of the spring 88 with the tapering sides or surfaces 84 and 85 symmetrical with respect to a line drawn through the axis of the shaft 82 and normal to the flat surface of the spring in contact with the cam, thereby forcing the free end of the spring backwardly away from the axis of the shaft 82. The moment, however, this point has been passed, the pressure of the spring against the end of the cam will continue the movement of the shaft in an anti-clockwise direction until the surface 85 lies flat against the upwardly extending free end of the spring 88, whereupon the lever 19 will be thrown to the position indicated by the dot-and-dash line 93 and will be held firmly in that position by said spring 88. When the fisherman throws the lever 19 in the opposite direction the operation of the parts will be reversed and when the lever has been pushed through substantially one-half of its path of travel the spring will snap the lever back to the original position as shown in Fig. 8 with the free end of the leaf-spring resting squarely against the flat surface 84.

This operation last described is characteristic of the operation of all of the modifications above described. As soon as the fisherman forces the lever 19 beyond its halfway point in its travel from one extreme position to the other, the spring mechanism mounted in the headplate 1c automatically throws the lever over to the limit of its movement, and with the gearing into and out of mesh dependent upon the direction in which the lever is moved, thereby avoiding any chance of the gears being allowed to remain partly in mesh or in incomplete contact which would result in friction and undue wear in the teeth of the gearing.

Having thus described our invention, what we claim and desire to protect by Letters Patent of the United States is:

1. In a free spool reel, the combination of a reel head, a spool spindle, one end of which is journaled in said head, a pinion fixed on said spindle, a driving gear, an oscillatory member mounted on the outer side of said head to oscillate, and movable back and forth in a fixed path, connections between said member and said driving gear to move said gear toward the axis of said pinion into mesh with said pinion when said oscillatory member is moved to one limit of its motion, and to move said driving gear away from the axis of said pinion and out of mesh with said pinion when said oscillatory member is moved to the other limit of its motion, and resilient means on said reel head to yieldingly hold said member at the limits of its motion in either direction, and operative, when said member is manually moved toward one of said limits beyond a point substantially midway between said limit, to automatically throw said member to that limit of its travel toward which it was being manually moved.

2. In a free spool reel, the combination of a reel-head, a spool spindle, one end of which is journaled in said head, a pinion fixed on said spindle, a plate mounted on the inner side of said head, a driving gear mounted on said plate, a free reel lever pivotally mounted in said head to move back and forth from one limit of its path of movement to the other limit thereof and connections between said lever and said plate to slide said plate and with it to carry the driving gear toward the axis of said pinion and into mesh with said pinion, when said lever is swung in one direction, and away from the axis of said pinion and with it to carry said driving gear away from the axis of said pinion out of mesh with said pinion when said lever is swung in the opposite direction, and resilient means mounted on said reel-head and cooperating with said lever to automatically throw said lever and the parts operated thereby to the limit of its travel when said lever is manually moved toward said limit beyond a point substantially half-way between the limits of its movement and to retain said lever at the end of its path of movement against accidental displacement.

3. In a free spool reel, the combination of a reel-head, a spool spindle, one end of which is journaled in said head, a pinion fixed on said spindle, a plate slidably mounted on the inner side of said head, a driving gear mounted on said plate, a free reel lever shaft also mounted for rotation in said reel-head, a free reel lever on the outside of said head and mounted on said shaft to oscillate said shaft, connection between said shaft and said plate for moving said plate by and in accordance with the rotary movement of said shaft, a cam-like member mounted on said shaft, resilient means cooperating therewith to throw said shaft and said lever to the limit of its movement in either direction when said lever is manually moved from one of its limits toward the other of its limits through more than substantially one-half the distance between said limits, the said driving gear on said plate being in complete mesh with said pinion when said lever is at one limit of its movement and completely out of mesh therewith when said lever is at the opposite limit of its movement.

4. In a free spool reel, the combination of a reel-head, a reel spindle, one end of which is journaled in said head, a pinion unitary with said

[redacted]

87.7

Examiner reel, a plate mounted on the inner side of said head, a driving gear mounted on said plate, a crank on the outer side of said head to rotate said driving gear, a free spool lever mounted on the outside of said head, a shaft journaled in said head and to which said lever is rigidly connected, a connection between said shaft and said plate to move said plate transversely to the axis of said pinion and with it said drive gear into mesh with said pinion when said lever is moved toward one limit of its movement and to move said driving gear away from the axis of said pinion and out of mesh with said pinion when said lever is moved to the other limit of its movement, a cam on said shaft and a snap mechanism cooperating with said cam to snap said lever to the extreme limit of its motion when said lever is manually pressed toward said limit beyond a point substantially midway between said limits.

5. In a fishing reel, in combination, a pair of end plates, a spindle journaled therebetween, a spool carried upon said spindle for rotation therewith, an operating handle for the reel, a pair of gears arranged for movement relatively to each other to effect a driving connection between said operating handle and said spindle, an oscillatory lever having a shaft journaled in one of said end plates, a pin disposed eccentrically upon the inner end of said shaft and having means operatively associated therewith to effect the movement of one of said gears relatively to the other whereby, when said lever is shifted in one direction or the other, the said handle is rendered either operative or inoperative to rotate said spindle, spring pressed means interposed between the inner end of said shaft and a fixed point on said end plate to automatically snap-throw said lever in either direction to one or the other of opposite limits of travel upon shifting said lever beyond a point substantially midway of said limits, the means operatively associated with said pin comprising a plate slidably engaging one of said end plates, said end plate and sliding plate combining to form a recess protectively housing said spring-pressed means.

6. In a free spool reel, the combination of a reel head, a spool, a driving train for the spool comprising a pinion adapted for driving engagement with said spool spindle, a driving gear for co-action with said pinion, means carried by the head to rotate said driving gear, one of said gears being movable to interrupt the driving connection between said means and the spool, a movable member, movement of which to one limit of its movement shifts said gear to interrupt the driving connection and free the spool from the rotating means and movement of which to the opposite limit of its movement shifts the gear to restore the connection between the rotating means and the spool and automatic means constructed and arranged to complete the movement of the movable member from either limit to the other of its limits when said member shall have been moved from either limit toward the other for a predetermined distance substantially less than the distance between said limits, there being a plate connecting said gear and movable member, said plate sliding upon said head, the plate and head combining to form a recess housing said automatic means.

7. A device as claimed in claim 1 wherein the head provides a recess protectively housing said resilient means.

8. A device as claimed in claim 1 wherein the connections between the member and driving gear and the head combine to produce a recess protectively housing said resilient means.

CLARENCE A. GODSHALK.
FREDERICK HENKE.
DAVID BEHRSING.